United States Patent [19]
Ahne et al.

[11] Patent Number: 6,133,844
[45] Date of Patent: Oct. 17, 2000

[54] SYSTEM AND METHOD FOR PROGRAMMING AN OPERATOR PANEL LED FOR PRINTER

[75] Inventors: Adam Jude Ahne; Mark Joseph Edwards, both of Lexington, Ky.

[73] Assignee: Lexmark International, Inc., Lexington, Ky.

[21] Appl. No.: 09/217,283

[22] Filed: Dec. 21, 1998

[51] Int. Cl.$^7$ .............................. G08B 5/22; G08B 25/00; B41B 27/00
[52] U.S. Cl. ............................... 340/815.45; 340/815.47; 340/525; 358/1.15; 362/800
[58] Field of Search ........................ 340/815.45, 815.47, 340/525; 358/1.1, 1.13, 1.14, 1.15; 362/800; 345/168, 173, 39, 46

[56] References Cited

U.S. PATENT DOCUMENTS

| | | | |
|---|---|---|---|
| 3,787,752 | 1/1974 | Delay | 345/147 |
| 4,207,734 | 6/1980 | Moyer | 368/83 |
| 4,602,191 | 7/1986 | Davila | 315/312 |
| 4,992,704 | 2/1991 | Stinson | 315/312 |
| 4,994,988 | 2/1991 | Yokoi | 341/22 |
| 5,121,113 | 6/1992 | Kedge et al. | 345/168 |
| 5,218,353 | 6/1993 | Okumura et al. | 340/815.01 |
| 5,317,307 | 5/1994 | Thomas, Jr. | 340/815.45 |
| 5,619,182 | 4/1997 | Robb | 340/479 |
| 5,909,180 | 6/1999 | Bailey et al. | 340/638 |
| 6,069,624 | 5/2000 | Dash et al. | 345/333 |

*Primary Examiner*—Donnie L. Crosland
*Attorney, Agent, or Firm*—D. Andrew Floam, Esq.

[57] ABSTRACT

A system and method for allowing a user to program characteristics of at least one light emitting diode (LED) in order to convey information about the operational status of an appliance, such as a printer. The user of the printer selects one of a plurality of display mode options for the LED for a particular operational status condition of the printer. For each display mode option, there is a range of parameters that can be programmed by the user. Display mode setting information for the particular operational status condition (and chosen parameters) is stored based on a selected display mode option. The display mode option may be tested for a particular set of parameters to allow the user to adjust the parameters to his/her liking. Moreover, a combination of display mode options may be programmed for an operational status condition. During printer run-time, the operational status of the printer is monitored, and through firmware and software, the LED is controlled to operate in accordance with the selected display mode option when it is determined that the particular operational status condition of the printer occurs.

21 Claims, 8 Drawing Sheets

SYSTEM AND METHOD FOR PROGRAMMING AN OPERATOR PANEL LED FOR PRINTER

BACKGROUND OF THE INVENTION

1. Field of the Invention

This invention relates generally to controlling a display panel of an electrical appliance, and more particularly to programming the display characteristics of a light emitting diode (LED) in an appliance, such as a printer device.

2. Related Art

LEDs are used in printer operator panels to indicate various printer status conditions, such as power on, out of paper, out of ink, paper tray selection, and printer errors. In "low" end printers, often for cost reasons, only one or two LED's and buttons are provided on the external control/display panel. Printer operational status information is communicated to the user through the LEDs.

Existing printer control/display panels are static, and particularly, the limited number of LEDs are not programmable, in contrast to many other features of the host personal computer (PC) to which the printer is usually connected. It is desirable to add programmability through the printer driver software of the printer to allow user adjustment of the printer operator panel LED functions.

SUMMARY OF THE INVENTION

Briefly, the present invention is directed to a system and method for allowing a user to program characteristics of at least one light emitting diode (LED) in order to convey information about the operational status of an appliance, such as a printer. The printer has a plurality of operational status conditions. The LED has a plurality of display mode options.

Information representing the plurality of operational status conditions of the printer and information representing the plurality of display mode options for the LED are stored in a user-accessible memory space of a PC. A user accesses this information through a user interface provided in a printer driver software program in order select one of the plurality of display mode options for the LED for a particular operational status condition of the printer.

The user of the printer selects one of the plurality of display mode options for the LED for a particular operational status condition of the printer. Moreover, for each display mode option, there is a range of parameters that can be programmed by the user. Display mode setting information for the particular operational status condition is stored based on a selected display mode option. The display mode option may be tested for a particular set of parameters to allow the user to adjust the parameters to his/her liking. A particular display mode option may be set for each and every operational status condition. Moreover, a combination of display mode options may be programmed for an operational status condition.

During printer run-time, the operational status of the printer is monitored, and through firmware and software, the LED is controlled to operate in accordance with the selected display mode option when it is determined that the particular operational status condition of the printer occurs.

The programmable LED functionality is provided in the printer driver software that resides in the host computer (client or server) to which the printer is connected. Consequently, very little, if any, modification needs to be made to the internal hardware components of the printer in order to support this enhanced functionality.

The above and other objects and advantages of the present invention will become more readily apparent when reference is made to the following description, taken in conjunction with the accompanying drawings.

DETAILED DESCRIPTION OF THE DRAWINGS

Figure 1:
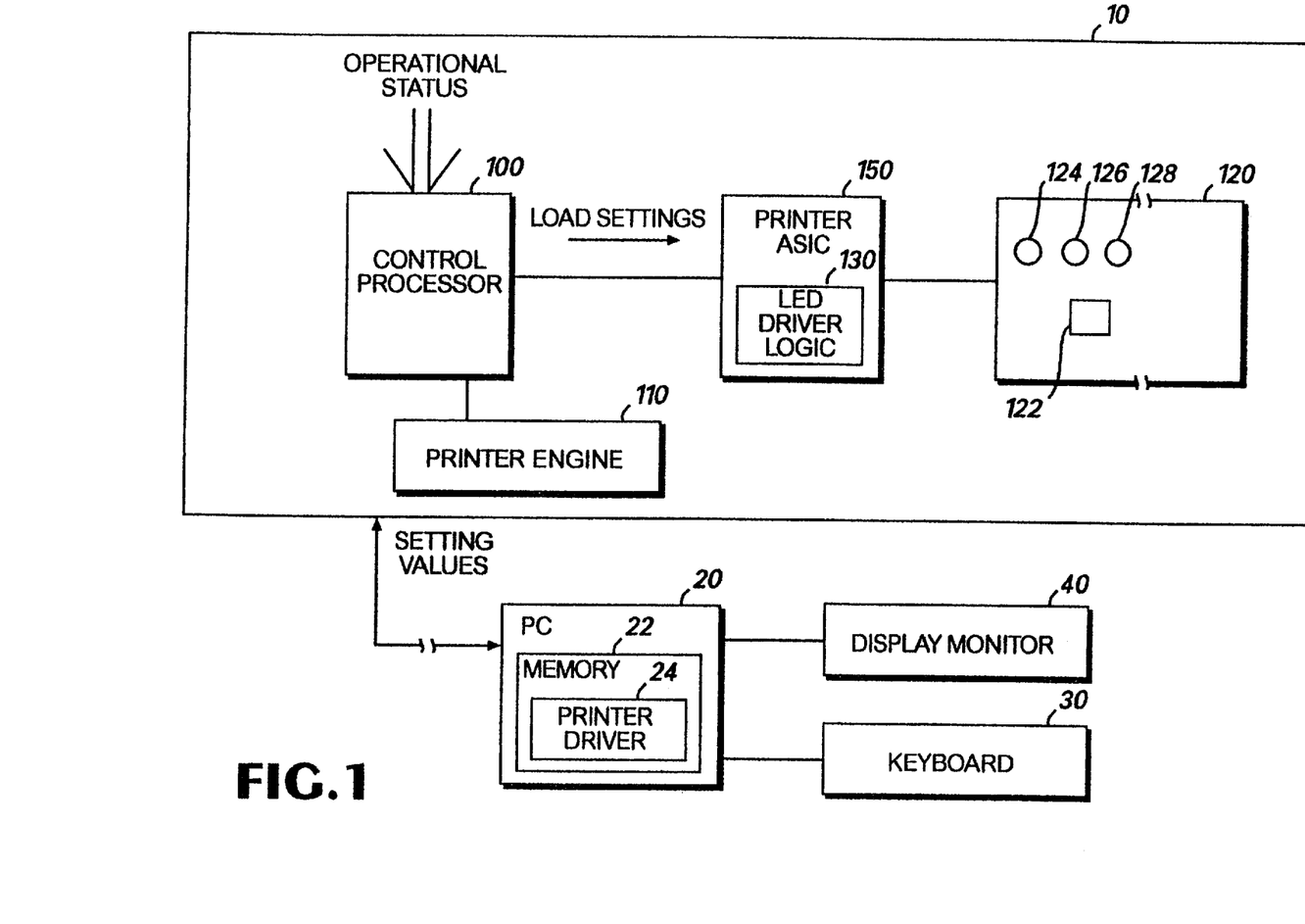
FIG. 1 is a block diagram of a printer showing the basic components of the system according to the present invention.

Referring first to FIG. 1, a printer 10 is shown that connects to a personal computer (PC) 20. The printer 10 is, for example, an inkjet printer and comprises all of the standard components known to exist in inkjet printers. Several of these components are illustrated for purposes of explaining the present invention. Specifically, the printer 10 comprises a control processor 100, a printer engine 110, an operator panel 120 that includes one or more control buttons 122 and one or more LEDs, such as three LEDs shown at reference numeral 124, 126 and 128. In addition, a printer application specific integrated circuit (ASIC) 150 is included that translates control signals generated by the control processor 100 to analog signals that drive the LEDs 124, 126 and 128. In addition, the printer ASIC 150 may convert commands generated on the operator panel 120, such as by the button 122, to signals for use by the control processor 100. Of particular importance is the LED driver logic 130 in the printer ASIC 150. The LED driver logic 130 is described in more detailed hereinafter in conjunction with FIG. 2.

The PC 20 is any standard PC. In the PC 20, memory (such as random access memory) 22 is provided to store, among other software, printer driver software 24 that performs several functions for interfacing the PC 20 to the printer 10. For example, the printer driver software converts image data into page image data to be acted on by the printer engine 110, controls other parameters of the printer operation, and importantly, includes graphical user interface software to control programming of the various parameters of printer operation. The PC 20 is connected to a keyboard 30 and a display monitor 40, as is well known in the art.

Figure 2:
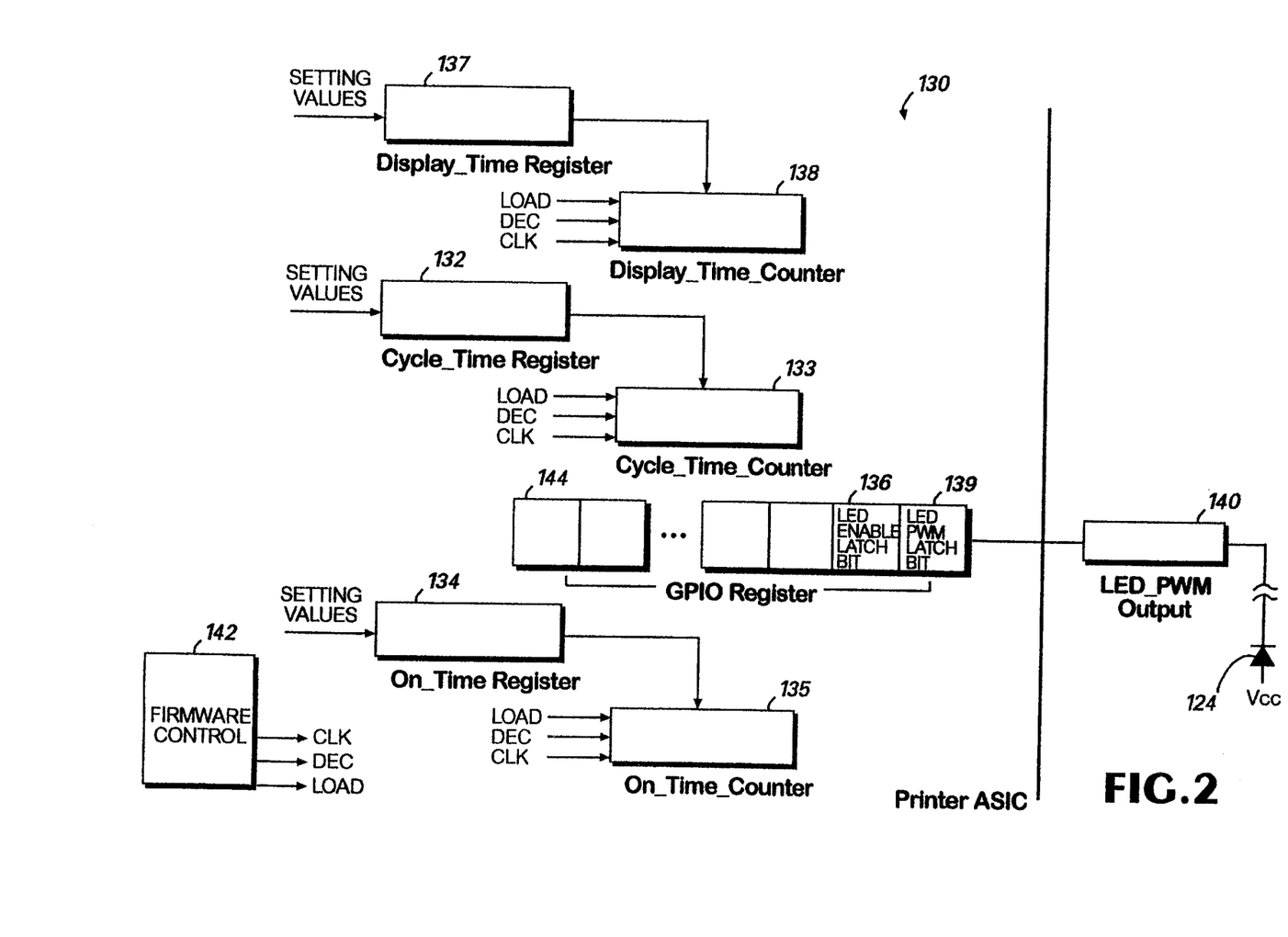
FIG. 2 is a block diagram of LED driver logic circuitry that drives the LED in accordance with user-programmable display mode settings.

FIG. 2 illustrates the LED driver logic 130 in the printer ASIC 150. Specifically, the LED driver logic 130 comprises a Cycle_Time register 132, a Cycle_Time counter 133, an On_Time register 134, an On_Time counter 135, an LED enable latch 136, an LED PWM latch 139, a Display_Time register 137 and a Display_Time counter 138. The LED enable latch 136 and LED PWM latch 139 are the last two bit locations of a general purpose input/output (GPIO) register 144. The state of the latches 136 and 139 are indicated by the state of the bits at those locations of the GPIO register 144. When the bit location is set to 1, the latch is enabled; when set to 0, it is disabled. The Display_Time counter 138, Cycle_Time counter 133 and On_Time counter 135 each may be reset to 0, decremented by 1 input (DEC) on each clock (CLK) input activation, or preset by the firmware with a value from another register via the LOAD input. In the printer ASIC there is general firmware control shown at reference numeral 142 that outputs the CLK signal, a DEC signal, LOAD signals and various set and reset control signals for the counters.

The function of the circuits shown in FIG. 2 is to output an LED power signal comprised of a pulse train whose pulse width and period are modulated to control the timing and the level of power delivered to the LED 124. The output of the LED PWM latch 139 becomes the pulse width modulated (PWM) signal that is coupled to the LED_PWM output 140. The LED_PWM output 140 buffers the signal output by the LED PWM latch 139 to drive the LED 124.

The Cycle_Time register 132 is used to set the period of the PWM signal and the On-Time register is used to set the width of each pulse. The firmware control 142 monitors the content of the counters 133, 135 and 138 and controls the content of the LED enable latch 136 and LED PWM latch 139. The LED enable latch 136 is set equal to 1 when the Display_Time counter 138 is non-zero; otherwise, the LED enable latch 136 is 0. The display mode options of the LED(s) are set by storing appropriate setting values (comprised of bit patterns) into the Cycle_Time register 132, the Display_Time register 137 and the On_Time register 134. The Display_Time register 137 stores a bit pattern which represents the overall period of time that the LED is to be energized. For example, the registers 132, 134 and 137 may be 8-bit registers, each capable of representing time to a 1-msec resolution. Consequently, each register would represent a range of 0 to 256 msec.

Figure 3:
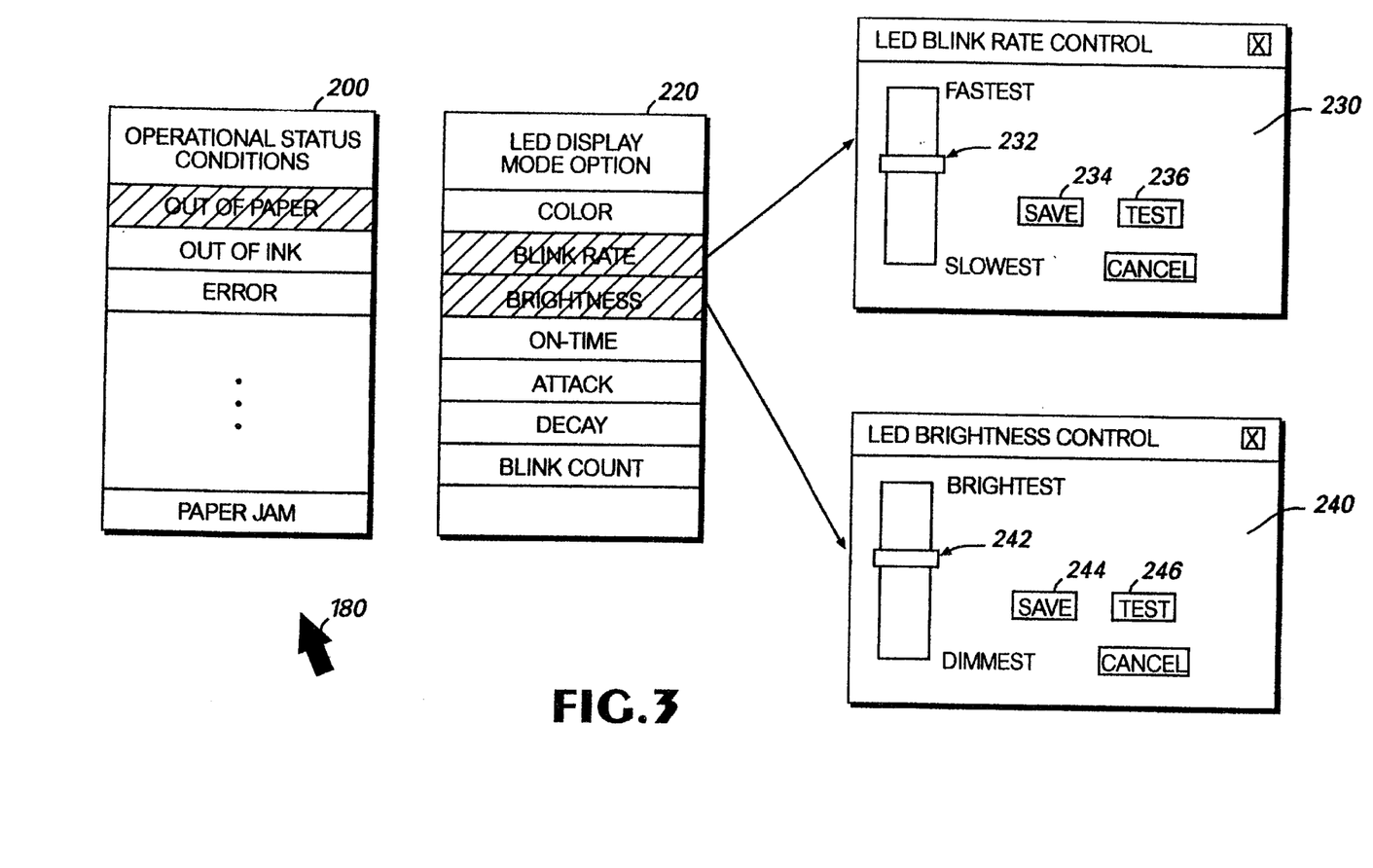
FIG. 3 is a diagram showing the basic elements of a user interface suitable for prompting a user to program the display mode settings.
Figure 4:
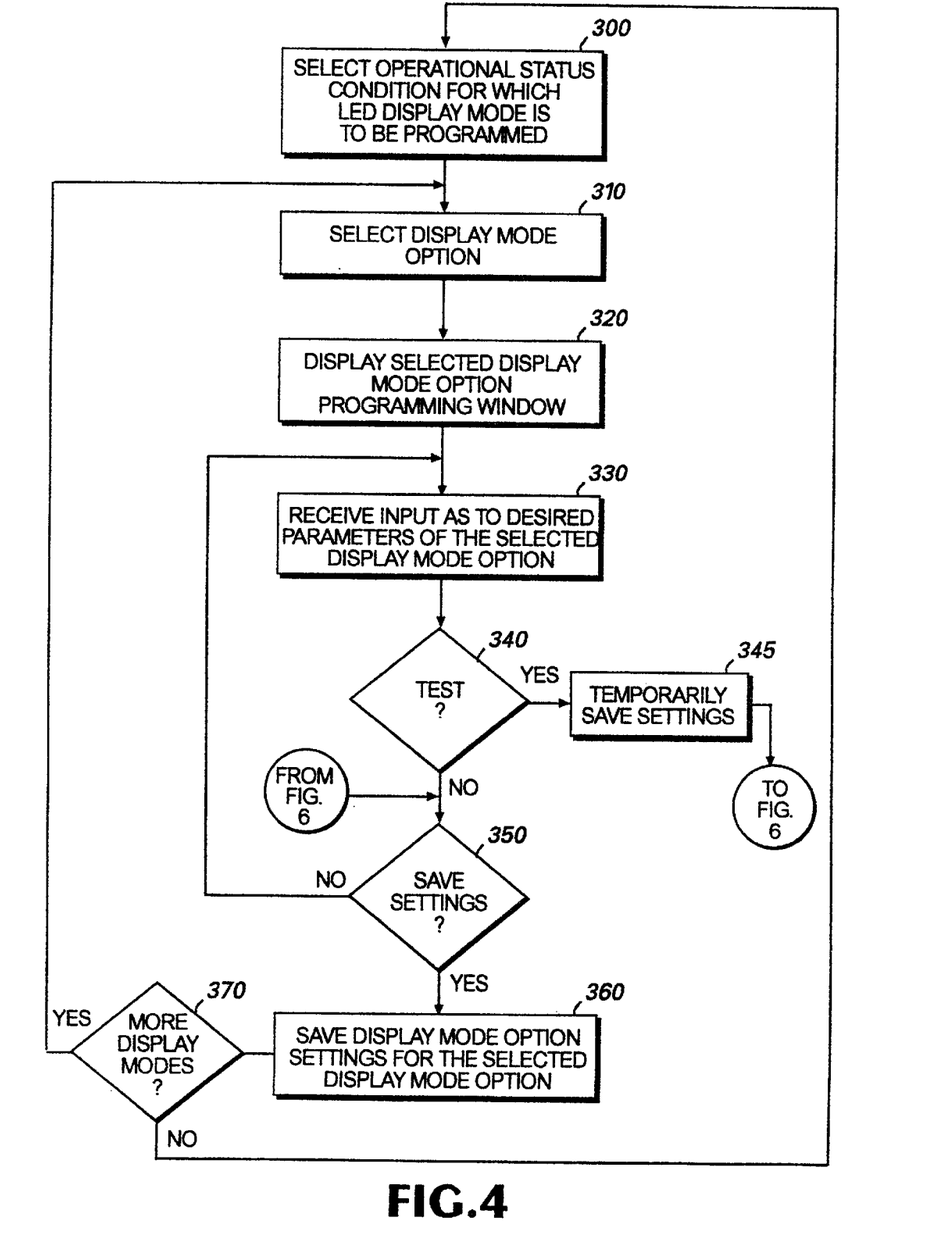
FIG. 4 is a flow chart showing the operation of the printer driver software for allowing a user to program an LED display mode option for a printer operational status condition.

Turning to FIGS. 3 and 4, the basic control logic that enables a user to program a display mode option for an LED will be described. FIG. 3 shows a table comprising a plurality of operational status conditions 200 of the printer for which display of an LED may be controlled, and a table comprising a plurality of LED display mode options 220 whose parameters can be programmed. The printer driver software 24 in the PC displays the information contained in tables 200 and 220 to the user through a suitable graphical user interface.

With reference to FIG. 4, in step 300, a user selects one of the operational status conditions to be programmed with a cursor 180. For example, the status condition "out of paper" is selected, as indicated by the diagonal slashes in FIG. 3. Next, in step 310, the user selects one (or more) of the LED display mode options 220. Depending upon which display mode option is selected, a particular programming window is displayed in step 320 to enable a user to adjust, test and save parameters for the selected display mode option. Two display mode option programming windows 230 and 240 are displayed as examples. When the selected display mode option is "blink rate" the programming window 230 is displayed. The "blink rate" programming window contains a sliding potentiometer type graphical interface 232, where the position of the cursor on the scale controls the blink rate between fastest and slowest extremes. A save button 234 and a test button 236 are also provided in the programming window. Similarly, when the selected display mode option is "brightness" a programming window 240 is displayed, containing a potentiometer 242, a save button 244 and a test button 246.

Figure 6:
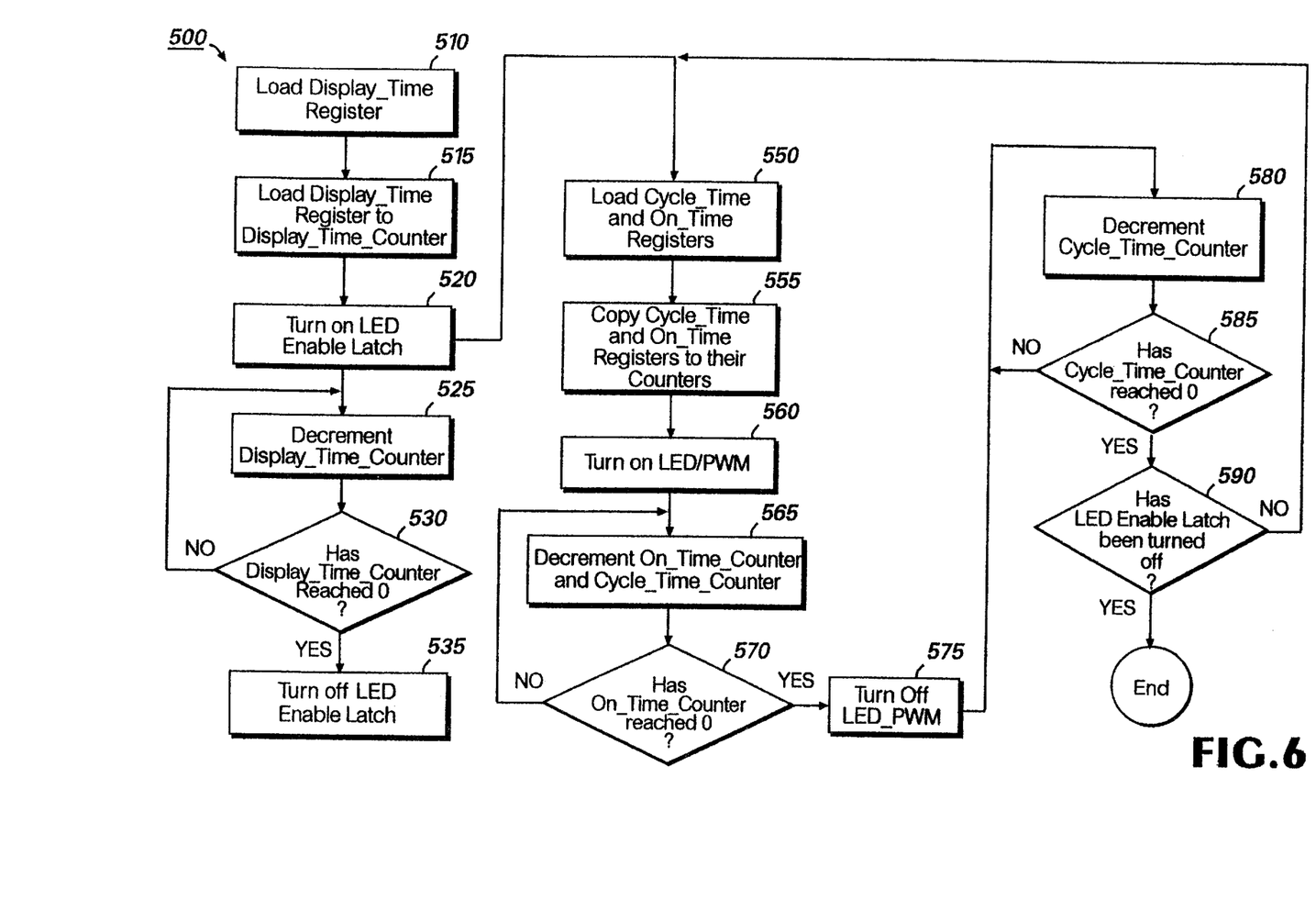
FIG. 6 is a flow chart showing the operation of the LED driver logic circuitry.
Figure 7:
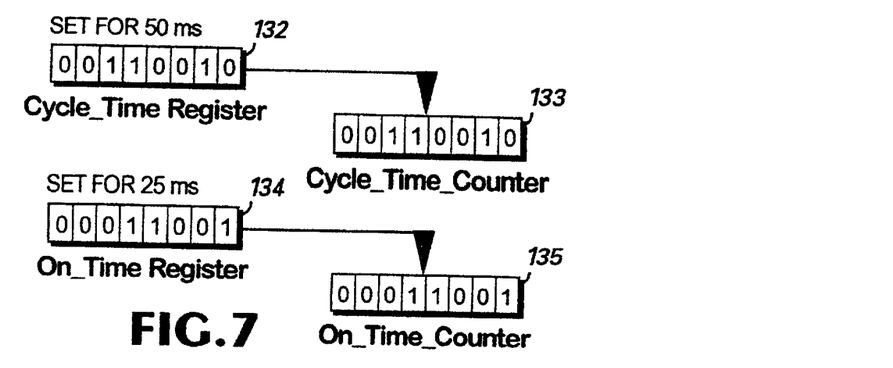
FIG. 7 is a diagram showing the content of the Cycle_Time register and On_Time register in accordance with an example of a display mode setting.

Referring back to FIG. 4, a user adjusts a parameter of the selected display mode option and the printer driver software receives this as input in step 330. The user may then test the display mode option with the current parameters by clicking the test button in the programming window. This is indicated in step 340, whereby in step 345, the settings for that display mode option are temporarily saved, and the LED display procedure of FIG. 6 is executed with the selected display mode settings to test the settings. FIG. 6 is described below.

If the settings are not tested, then the process continues to step 350 wherein the display mode settings can be saved, or if those are not desired, then the process repeats from step 330. Otherwise, the display mode settings for the selected display mode option (for the particular operational status condition) are saved in step 360.

It is possible that a user may desire to set multiple display mode options for a single operational status condition. For example, a user may desire to set the blink rate and brightness of an LED for the "out of paper" status condition. To this end, step 370 allows a user to select other display modes for the selected operational status condition and the process repeats from step 300.

Figure 5:
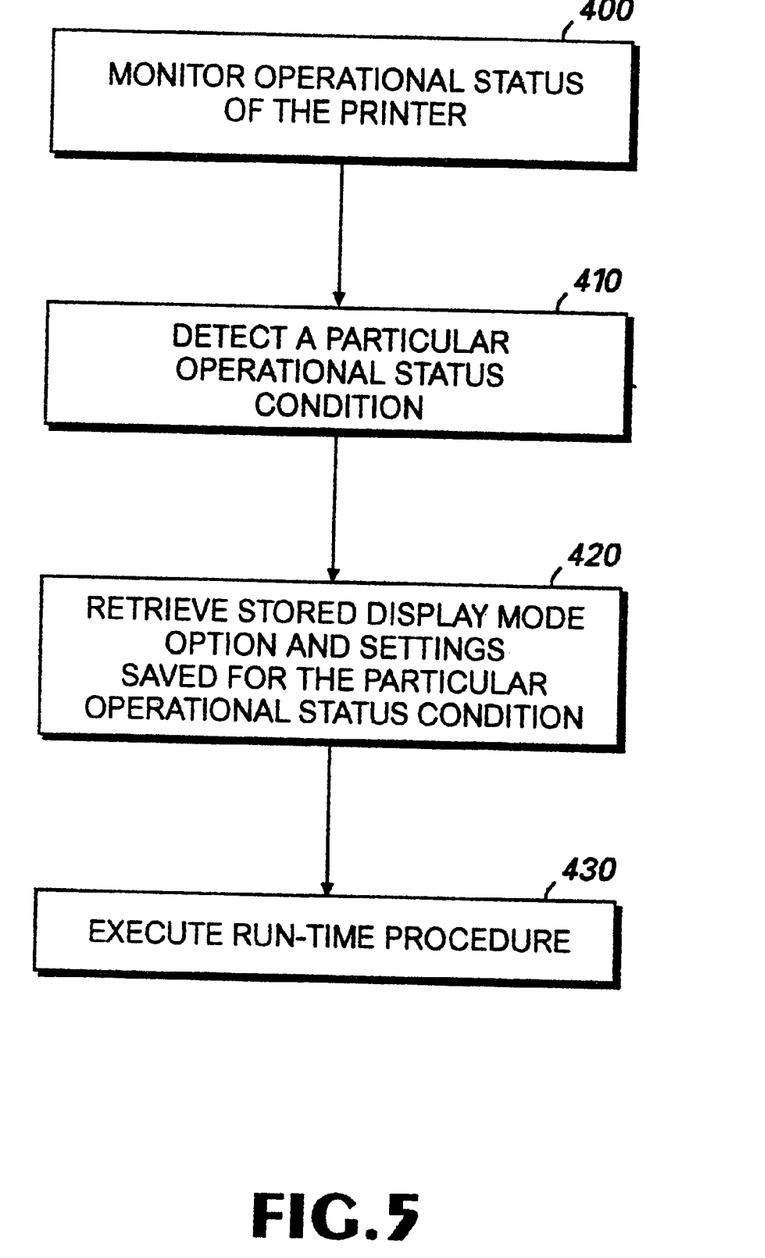
FIG. 5 is a flow chart depicting the process of monitoring the printer operational status and triggering the appropriate display mode option.

Once display mode options have been selected and saved for the desired operational status conditions, the printer driver software enters the procedure of FIG. 5. In step 400, the operational status of the printer is monitored. The control processor 100 of the printer 10 (FIG. 1) receives status information from the various components of the printer. When a particular operational status condition is detected in step 410, the control processor 100 sends status signals representing the operational status condition to the printer driver software. The PC 20, under control of the printer driver software, retrieves the stored displayed mode option settings for the particular operational status condition in step 420. In step 430, the LED display procedure (FIG. 6) is executed with the retrieved display mode option settings.

FIG. 6 illustrates the LED display procedure 500 used during run-time (that is, while the printer is in operation) or for testing a display mode option setting as explained above in conjunction with FIGS. 3 and 4. Reference is also made to FIG. 2.

There are two processes in the LED display procedure that occur simultaneously. One process comprises steps 510–535 and is executed to control the overall on-time of the LED. The other process comprises steps 550–590 and is executed during the overall on-time of the LED in order to control the parameters (duty cycle, period, etc.) of the PWM signal to control the energization of the LED.

In step 510, to turn on the LED, the printer driver software transmits display mode setting information to the LED driver logic to load the Display_Time register 137, the Cycle_Time register 132 and the On_Time register 134 according to the user-programmed settings. At the beginning of the overall LED display period, the contents of the Display_Time register are loaded into the Display_Time counter 138 in step 515. In step 520, the firmware control 142 writes a logic 1 to the bit location of the GPIO register 144 corresponding to the LED enable latch 136.

In step 525, the Display_Time counter 138 is decremented by one count.

Next, in step 530, the content of the Display_Time counter 138 is examined by the firmware to determine whether it is zero. This is done with a standard programming comparison to zero command, and examining the result of the comparison. When the content of the Display_Time counter 138 reaches zero, the firmware control 142 turns off the LED enable latch (by setting it to zero) in step 535, thereby ending the display time cycle of the LED.

When the LED enable latch 136 is set to 1 in step 520, the second process shown in FIG. 6 begins at step 550. In step 550, the firmware control loads the Cycle_Time register 132 and On_Time register 134 with bit patterns representing the proper setting values transmitted by the printer driver software. Next, in step 555, the contents of the Cycle_Time register 132 is copied into the Cycle_Time counter 133 and the contents of the On_Time register 134 is copied into the On_Time counter 135. In step 560, the LED PWM latch 139 is set to logic 1, thereby enabling the LED-PWM output 140 and energizing the LED 124. This starts the "pulse on" portion within the PWM signal period. In step 565, the firmware control 142 decrements the Cycle_Time counter 133 and the On_Time counter 135. This waveform corresponds to the PWM signal, whose pulse width is dependent on the value of the On_Time register 134 and whose period is dependent on the content of the Cycle_Time register 132.

In step 570, the content of the On_Time counter 135 is examined by the firmware control 142 to determine whether it has reached zero. Once it reaches zero, then the LED PWM latch 139 is set to 0, thereby rendering the value of the LED PWM output zero, de-energizing the LED. This corresponds to the beginning of the "pulse off" phase within the PWM signal period.

Next, in step 580, the Cycle_Time counter 133 is decremented. In step 585, the firmware control 142 determines whether the Cycle_Time counter 133 has reached zero. If the Cycle_Time counter 133 has not reached zero, the process repeats from step 580. If it has, then in step 590, the firmware control 142 determines whether the LED enable latch 136 has been turned off (i.e., whether the Display_Time Counter 138 has reached zero in step 530). If the LED enable latch is still on, the process continues from step 550, starting another PWM cycle. If the LED enable latch has been turned off, then the process ends.

To turn the LED on indefinitely, the Display_Time register 137 is loaded with the value "1" and this value is copied into the Display_Time counter 138. The firmware control 142 recognizes the content of the Display_Time register 137 as a special "code" and does not automatically decrement the Display_Time counter 138. This is useful to display the LED indefinitely in response to a particular error condition that the user must take action to correct before the LED is turned off. The firmware control 142 is responsive to the corrective action to decrement the Display_Time counter 138 by one count to disable the LED enable latch 136 and thereby turn the LED off.

An LED is caused to blink by loading the Display_Time register 137 with the desired blink on time. The contents of the Display_Time register 137 is copied into the Display_Time counter 138. The firmware control 142 decrements the Display_Time counter 138 as described above, and restarts the sequence at the programmed blink rate.

Figure 8:
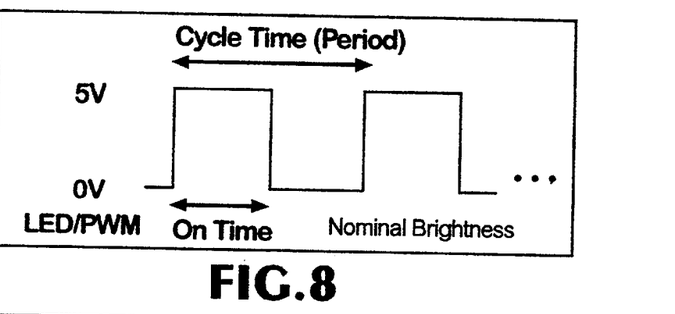
FIGS. 8–10 are timing diagrams of the pulse width modulated (PWM) LED power signal showing the programmable variations of the signal according to a desired LED brightness level.

With reference to FIGS. 7–10, examples of the timing pattern of the LED PWM power signal are described. The Cycle_Time and On_Time registers are 8 bits in this example, where each bit represents a time period of 1 msec. For a nominal LED brightness, the Cycle_Time register is loaded with a bit pattern representing 50 msec (00110010) and the On_Time register is loaded with a bit pattern representing 25 msec (00011001). The timing of the LED PWM power signal corresponding to these settings is shown in FIG. 8.

Figure 9:
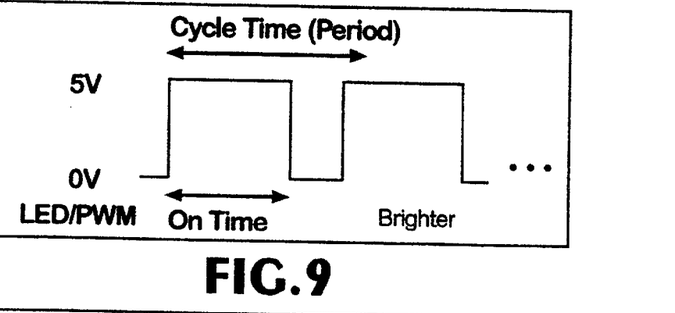
Figure 10:
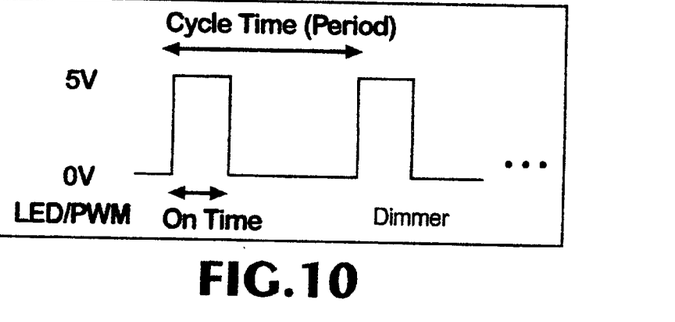

To brighten the LED from a nominal brightness level, the contents of the On_Time register is loaded with a bit pattern to represent a longer period of time, thereby increasing the LED signal duty cycle (the "on" period) and the corresponding average power delivered to the LED. FIG. 9 shows the timing of the LED PWM power signal generated from settings that will cause the LED to illuminate with a brighter intensity. To reduce the brightness, the On_Time register is loaded with a bit pattern corresponding to a shorter period of time, reducing the corresponding average power delivered to the LED. FIG. 10 shows the timing pattern of the LED power signal that will cause the LED to illuminate with a dimmer intensity.

Figure 11:
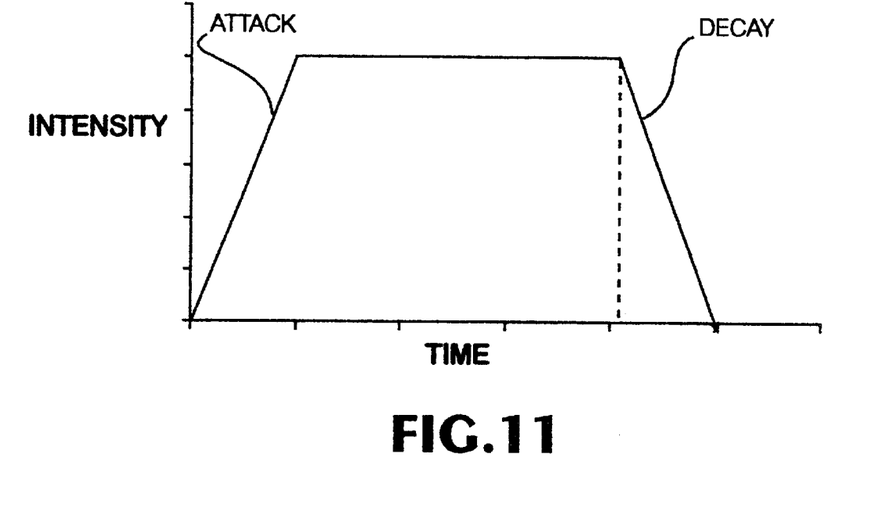
FIG. 11 is a timing diagram of the average power of the PWM signal showing how the attack rate and decay rate of the LED may be controlled.

Further, the rate at which the LED is turned on, called the "attack rate" and the rate at which it is turned off, called the "decay rate" are adjustable by varying the value placed in the On_Time register for each iteration through a turn-on/turn-off cycle. For example, the attack rate can ramp up linearly by starting with a value in the On_Time register of 0, and increasing the value for each on/off cycle until the On_Time reaches a value representing the nominal (or adjustable predetermined) LED brightness level. This is shown at the beginning of the overall on time of the LED in FIG. 11. The LED may be maintained at this level until it is turned off. Also, the decay rate may be controlled to ramp down linearly from a nominal (or adjustable predetermined) brightness level, and the value of the On_Time register is decremented at each on/off cycle until the On_Time reaches 0. This is shown at the end of the overall on time of the LED in FIG. 11.

Figure 12:
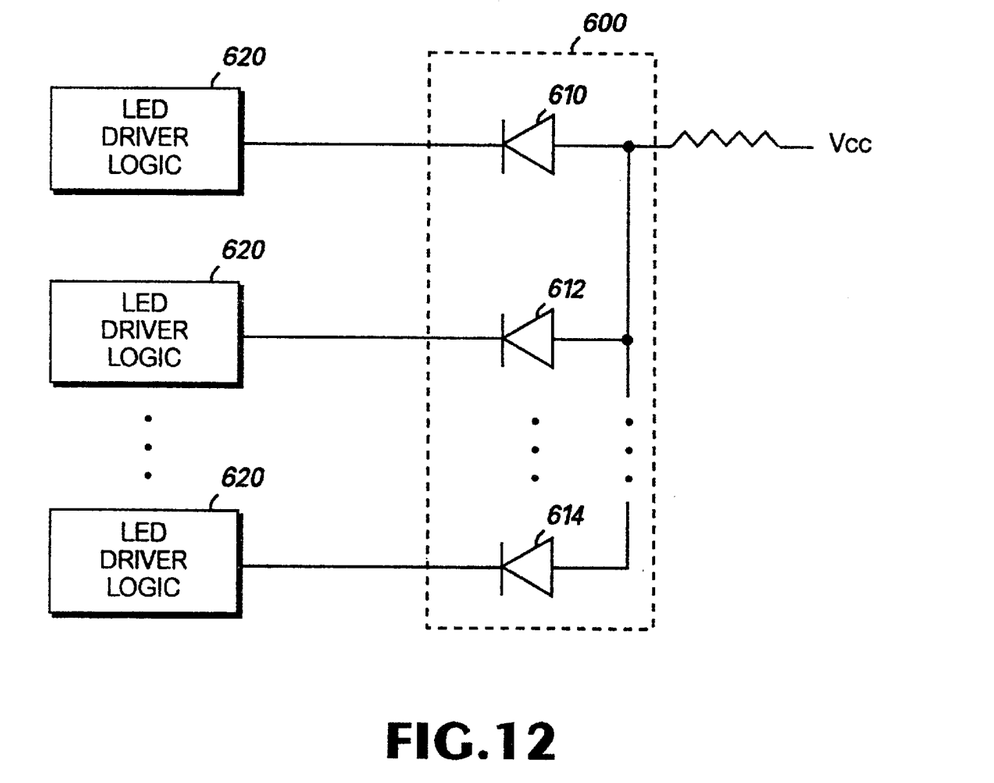
FIG. 12 is a block diagram showing the control architecture generalized for a plurality of LEDs, such as a plurality of different color LEDs.

The basic concepts described above are expandable to controlling multiple LEDs. For example, referring FIG. 12, three LEDs 610, 612 and 614 are shown each driven by dedicated LED driver logic 620 similar to that shown in FIG. 2. Moreover, the LEDs 610, 612 and 614 may be different color LEDs within a single LED package 600 contained under a plastic lens housing. A plurality of power signals are generated, each being delivered to one of the plurality of LEDs. A dedicated LED driver logic circuit controls the intensity and timing of each LED 610, 612 and 614. The width of the pulses of each of the power signals is controlled so as to independently control a brightness of each of the plurality of LEDs, respectively, thereby controlling the intensity of light emitted by each of the plurality of LEDs. By controlling the relative intensity of each LED, a color "palette" is created enabling the user to control the combined color and intensity of the LED package 600 as if emitted by a single LED. Thus, the user can control the color of the light emitted by the LED package 600 as a parameter of a display mode setting for a particular display mode option. Furthermore, the blinking of the LEDs can be controlled to interleave the blinking cycle of an LED with the blinking cycles of the others LEDs.

There are many utilities and applications for the system and method according to the present invention. For example, the LED can be automatically dimmed in response to determining that the operational status condition of the printer has entered an energy saver mode.

In summary, according to one aspect, the present invention is directed to a method in a printer for allowing a user to program characteristics of at least one light emitting diode (LED) in order to convey information about the operational status of the printer, the method comprising steps of: providing a plurality of operational status conditions of the printer; providing a plurality of display mode options for the LED; selecting one of the plurality of display mode options for the LED for a particular operational status condition of the printer; storing display mode setting information for the particular operational status condition of the printer based on a selected display mode option; monitoring the operational status of the printer; and controlling the LED to operate in accordance with the selected display mode option when it is determined that the particular operational status condition of the printer occurs.

The display mode options may be any one or more of display mode options selected from the group of color, blink rate, blink count, attack, decay, brightness, and on-time. Information representing the plurality of operational status conditions of the printer and information representing the plurality of display mode options for the LED are stored in a user-accessible memory space of a PC. A user accesses this information through a user interface provided in a printer driver software program in order select one of the plurality of display mode options for the LED for a particular operational status condition of the printer.

A power signal that comprises a train of pulses is generated to energize the LED. The width of the pulses is adjusted and period of the pulses is adjusted to control the brightness level of the LED. In order to adjust the attack rate or decay rate of the LED, the width of the pulses can be progressively changed over consecutive cycles of the power signal.

According to another aspect, the present invention is directed to a system for allowing a user to program characteristics of at least one light emitting diode (LED) in order to convey information about the operational status of the printer. The system comprises LED driver logic circuitry in the printer coupled to the LED for energizing the LED; a control processor in the printer for monitoring the operational status conditions of the printer and generating as output status signals representative thereof; and a computer coupled to the printer for communicating information and commands to the printer and receiving the output status signals from the printer. The computer includes a software program stored therein including instructions for performing the steps of;
  (i) listing a plurality of display mode options for the LED to be displayed to a user;
  (ii) providing a user-interface to permit the user to select one of the plurality of display mode options for the LED for a particular operational status condition of the printer;
  (iii) storing display mode setting information for the particular operational status condition of the printer based on a selected display mode option; and
  (iv) transmitting to the LED driver logic circuitry display mode setting information corresponding the selected display mode option in response receiving status signals indicating that the particular operational status condition of the printer is occurring.

According to a still further aspect, the present invention is directed to a computer-readable medium storing a plurality of instructions for execution by a computer to perform the steps of:
  (a) displaying a list of a plurality of display mode options for an LED on a printer connected to the computer;
  (b) displaying a user-interface to permit the user to select one of the plurality of display mode options for the LED for a particular operational status condition of the printer;
  (c) storing display mode setting information for the particular operational status condition of the printer based on a selected display mode option; and
  (d) transmitting to a printer display mode setting information corresponding to the selected display mode option in response to receiving status signals from the printer indicating that the particular operational status condition of the printer is occurring.

Finally, the present invention is also directed to a system for allowing a user to program characteristics of at least one light emitting diode (LED) in order to convey information about the operational status of the printer. The system comprises means for storing information in the printer for a plurality of operational status conditions of the printer; means for storing a plurality of display mode options for the LED for a particular operational status condition of the printer; means for permitting a user to select one of the plurality of display mode options for the LED for particular operational status condition of the printer; means for storing display mode setting information for the particular operational status condition of the printer based on a selected display mode option; and means for monitoring the operational status of the printer and controlling the LED to operate in accordance with the selected display mode option when it is determined that the particular operational status condition of the printer occurs.

The above description is intended by way of example only, and is not intended to limit the present invention in any way, except as set forth in the following claims.

What is claimed is:

1. A method in a printer for allowing a user to program characteristics of at least one light emitting diode (LED) in order to convey information about the operational status of the printer, the method comprising steps of:
  (a) providing a plurality of operational status conditions of the printer;
  (b) providing a plurality of display mode options for the LED;
  (c) selecting one of the plurality of display mode options for the LED for a particular operational status condition of the printer;
  (d) storing display mode setting information for the particular operational status condition of the printer based on a selected display mode option;
  (e) monitoring the operational status of the printer; and
  (f) controlling the LED to operate in accordance with the selected display mode option when it is determined that the particular operational status condition of the printer occurs.

2. The method of claim 1, wherein the providing step comprises providing one or more display mode options selected from the group consisting of color, blink rate, blink count, attack, decay, brightness, and on-time.

3. The method of claim 1, and further comprising the step of controlling the LED to operate in accordance with a selected display mode option for the particular operational status condition to test the selected display mode option prior to storing corresponding display mode setting information.

4. The method of claim 1, and further comprising the step of displaying a graphical user interface representing a range of parameters for each display mode option and for permitting a user to select a value within the range of parameters.

5. The method of claim 2, wherein the controlling step comprises steps of:
   (i) generating a power signal that is delivered to the LED for activating the LED, the power signal comprising a train of pulses;
   (ii) controlling a width of the pulses so as to control a brightness level of the LED.

6. The method of claim 2, wherein the controlling step comprises steps of:
   (i) generating a power signal that is delivered to the LED for activating the LED, the power signal comprising a train of pulses; and
   (ii) progressively changing the width of the pulses in the power signal over consecutive cycles of the power signal.

7. The method of claim 6, wherein the progressively changing step comprises progressively increasing the width of the pulses over consecutive cycles of the power signal to a nominal width so as to control the attack rate of the LED to a predetermined brightness level.

8. The method of claim 6, wherein the progressively changing step comprises progressively decreasing the width of the pulses over consecutive cycles of the power signal from a nominal width so as to control the decay rate of the LED from a predetermined brightness level.

9. The method of claim 2, wherein the at least one LED comprises a plurality of LEDs, wherein the controlling step comprises steps of:
   (i) generating a plurality of power signals, each being delivered to one of the plurality of LEDs for activating a corresponding LED, each power signal comprising a train of pulses; and
   (ii) controlling a width of the pulses of each of the power signals so as to independently control a brightness of each of the plurality of LEDs, respectively, thereby controlling the intensity of light emitted by each of the plurality of LEDs.

10. The method of claim 9, wherein each of the plurality of LEDs is of a different color, and wherein the controlling step comprises controlling the relative intensity of each of the LEDs so that the combined light emitted by the plurality of LEDs is of a desired color.

11. The method of claim 2, wherein the particular operational status condition of the printer is an energy saver mode, and wherein the controlling step comprises automatically dimming the LED in response to determining that the operational status condition of the printer has entered the energy saver mode.

12. A system for allowing a user to program characteristics of at least one light emitting diode (LED) in order to convey information about the operational status of a printer, the system comprising:
   (a) LED driver logic circuitry in the printer coupled to the LED for energizing the LED;
   (b) a control processor in the printer for monitoring the operational status conditions of the printer and generating as output status signals representative thereof;
   (c) a computer coupled to the printer for communicating information and commands to the printer and receiving the output status signals from the printer, the computer including a software program stored therein including instructions for performing the steps of;
      (i) listing a plurality of display mode options for the LED to be displayed to a user;
      (ii) providing a user-interface to permit the user to select one of the plurality of display mode options for the LED for a particular operational status condition of the printer;
      (iii) storing display mode setting information for the particular operational status condition of the printer based on a selected display mode option; and
      (iv) transmitting to the LED driver logic circuitry display mode setting information corresponding the selected display mode option in response receiving status signals indicating that the particular operational status condition of the printer is occurring.

13. The system of claim 12, wherein the LED driver logic circuitry comprises:
   (i) a display-time counter for counting down from a value representing the overall on-time of the LED;
   (ii) a display-time register coupled to the display-time counter;
   (iii) a cycle-time counter for counting down from a value representing a period of a LED power signal comprising a pulse train;
   (iv) a cycle-time register coupled to the cycle-time counter;
   (v) an on-time counter for counting down from a value representing the pulse width for the on-time of one cycle of the pulse train;
   (vi) an on-time register coupled to the on-time counter;
   (vii) a first latch being enabled when the display-time counter is non-zero for a pulse-on portion of a cycle of a pulse train; and
   (viii) a second latch being enabled when the on-time counter is non-zero so as to output a pulse width modulated timing pattern for the LED power signal.

14. The system of claim 13, wherein the software program stored in the computer comprises instructions for storing bit patterns representing setting values to the display-time register, cycle-time register and cycle-time counter in accordance with the selected display mode option settings.

15. The system of claim 14, wherein the LED driver logic circuitry loads the contents of the display-time, cycle-time and on-time registers into the display-time, cycle-time and on-time counters, respectively.

16. The system of claim 12, wherein the instructions in the software program for performing the listing step comprise instructions for listing one or more display mode options selected from the group consisting of color, blink rate, blink count, attack, decay, brightness, and on-time.

17. The system of claim 12, wherein the instructions in the software program for transmitting display mode setting information comprise instructions for controlling the LED to operate in accordance with a selected display mode option for the particular operational status condition to test the selected display mode option prior to storing corresponding display mode setting information.

18. A computer-readable medium storing a plurality of instructions for execution by a computer to perform the steps of:
   (a) displaying a list of a plurality of display mode options for an LED on a printer connected to the computer;
   (b) displaying a user-interface to permit the user to select one of the plurality of display mode options for the LED for a particular operational status condition of the printer;

(c) storing display mode setting information for the particular operational status condition of the printer based on a selected display mode option; and (d) transmitting to a printer display mode setting information corresponding to the selected display mode option in response to receiving status signals from the printer indicating that the particular operational status condition of the printer is occurring.

19. The computer-readable medium of claim 18, wherein the instructions for displaying display mode options comprise instructions for listing one or more display mode options selected from the group consisting of color, blink rate, blink count, attack, decay, brightness, and on-time.

20. The computer-readable medium of claim 18, wherein the instructions for transmitting display mode setting information comprise instructions for controlling the LED to operate in accordance with a selected display mode option for the particular operational status condition to test the selected display mode option prior to storing corresponding display mode setting information.

21. A system for allowing a user to program characteristics of at least one light emitting diode (LED) in order to convey information about the operational status of a printer, the system comprising:

(a) means for storing information in the printer for a plurality of operational status conditions of the printer;

(b) means for storing a plurality of display mode options for the LED for a particular operational status condition of the printer;

(c) means for permitting a user to select one of the plurality of display mode options for the LED for particular operational status condition of the printer;

(d) means for storing display mode setting information for the particular operational status condition of the printer based on a selected display mode option; and (e) means for monitoring the operational status of the printer and controlling the LED to operate in accordance with the selected display mode option when it is determined that the particular operational status condition of the printer occurs.

* * * * *